(12) United States Patent
Neumaier et al.

(10) Patent No.: US 11,076,217 B2
(45) Date of Patent: Jul. 27, 2021

(54) PORTABLE DEVICE AND METHOD FOR OPERATING THE SAME

(71) Applicant: Infineon Technologies AG, Neubiberg (DE)

(72) Inventors: Daniel Neumaier, Feldkirchen (AT); Christian Bretthauer, Munich (DE); Dietmar Straeussnigg, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/879,229

(22) Filed: May 20, 2020

(65) Prior Publication Data

US 2021/0014600 A1 Jan. 14, 2021

(30) Foreign Application Priority Data

Jul. 11, 2019 (EP) .................................... 19185843

(51) Int. Cl.
*H04R 1/10* (2006.01)
*G01S 15/04* (2006.01)
*G01S 15/89* (2006.01)

(52) U.S. Cl.
CPC ............ *H04R 1/1041* (2013.01); *G01S 15/04* (2013.01); *G01S 15/8906* (2013.01); *H04R 2201/003* (2013.01); *H04R 2460/01* (2013.01)

(58) Field of Classification Search
CPC .... H04R 1/1041; G01S 15/04; G01S 15/8906
See application file for complete search history.

(56) References Cited

U.S. PATENT DOCUMENTS

| | | | |
|---|---|---|---|
| 2014/0146976 A1 | 5/2014 | Rundle | |
| 2016/0165333 A1* | 6/2016 | Gokingco | H04L 69/28 381/74 |
| 2017/0214994 A1* | 7/2017 | Gadonniex | H04R 1/105 |
| 2019/0012444 A1 | 1/2019 | Lesso et al. | |
| 2020/0142044 A1* | 5/2020 | Matsuura | G01S 7/527 |

FOREIGN PATENT DOCUMENTS

| | | | | |
|---|---|---|---|---|
| EP | 2271134 A1 | 1/2011 | | |
| EP | 3285049 A1 * | 2/2018 | ........... | H04R 29/005 |

* cited by examiner

*Primary Examiner* — Simon King
(74) *Attorney, Agent, or Firm* — Slater Matsil, LLP

(57) ABSTRACT

A portable device includes a microphone structure for converting a received audio signal into an electronic signal representing the received audio signal and for transceiving an ultrasonic wave by transmitting the ultrasonic wave and by receiving a reflection of the ultrasonic wave. The portable device includes a control unit for evaluating the reflection of the ultrasonic wave to obtain an evaluation result and for controlling an operation of the portable device based on the evaluation result.

13 Claims, 10 Drawing Sheets

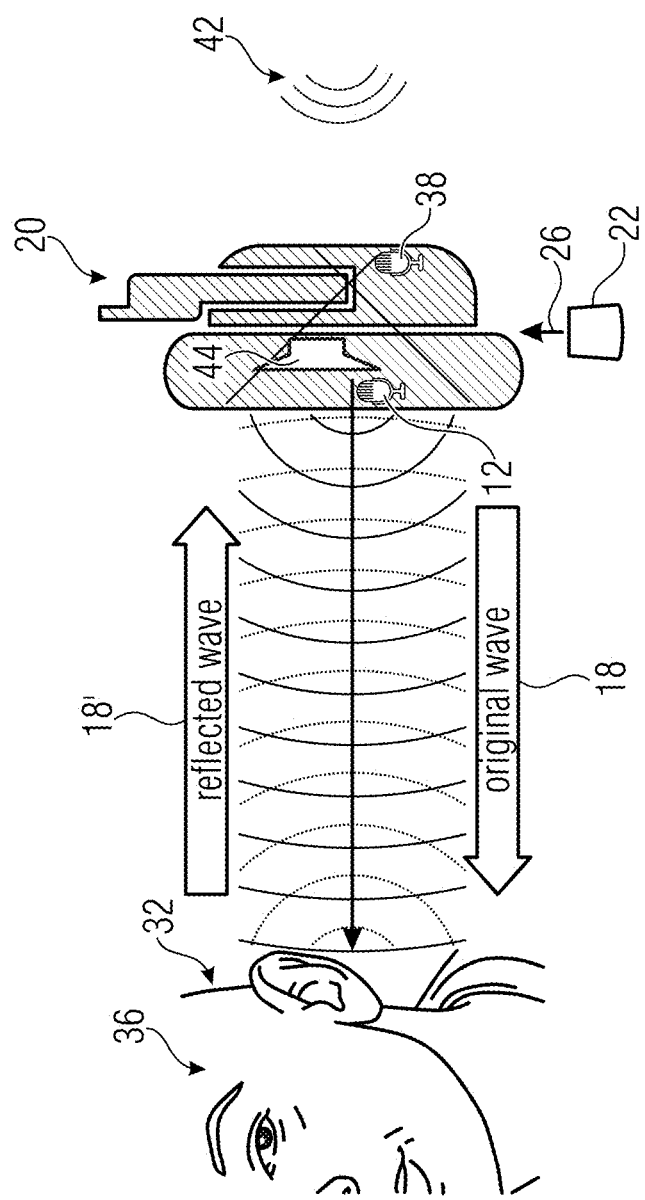

PORTABLE DEVICE AND METHOD FOR OPERATING THE SAME

This application claims the benefit of European Patent Application No. 19185843.0, filed on Jul. 11, 2019, which application is hereby incorporated herein by reference.

TECHNICAL FIELD

The present disclosure is related to a portable device and to a method for operating the same. The present disclosure further relates to a proximity-based headphone wear-detection by using an audio microphone with ultrasonic transceiver functionality.

BACKGROUND

Portable devices may use a battery for their power supply. The user may switch on and off the device independent on a use thereof, i.e., the user may switch on the device so as to use it and may switch off the device after the use. Example devices are, for example, headphones.

There is a request for long operating times of portable devices and/or for a comfortable operation of portable devices.

SUMMARY

Embodiments provide a portable device that comprises a microphone structure configured for converting a received audio signal into an electronic signal representing the received audio signal and for transceiving an ultrasonic wave by transmitting the ultrasonic wave and by receiving a reflection of the ultrasonic wave. The portable device comprises a control unit configured for evaluating the reflection of the ultrasonic wave so as to obtain an evaluation result and for controlling an operation of the portable device based on the evaluation result. This allows to control the operation so as to allow for power saving, e.g., in an unused state and thus for long operating times and/or for a comfortable operation based on the reflected ultrasonic wave.

A further embodiment provides for a method for operating a portable device. The method comprises converting a received audio signal into an electronic signal representing the received audio signal. The method further comprises transceiving an ultrasonic wave by transmitting the ultrasonic wave and by receiving a reflection of the ultrasonic wave. The method comprises evaluating the reflection of the ultrasonic wave so as to obtain an evaluation result. The method further comprises controlling an operation of the portable device based on the evaluation result.

Further embodiments are described in the dependent claims.

BRIEF DESCRIPTION OF THE DRAWINGS

Embodiments will be described in the following while making reference to the accompanying drawings in which:

FIG. 2a shows a schematic diagram of a portable device according to an embodiment interacting with a user;

Figure 1A:
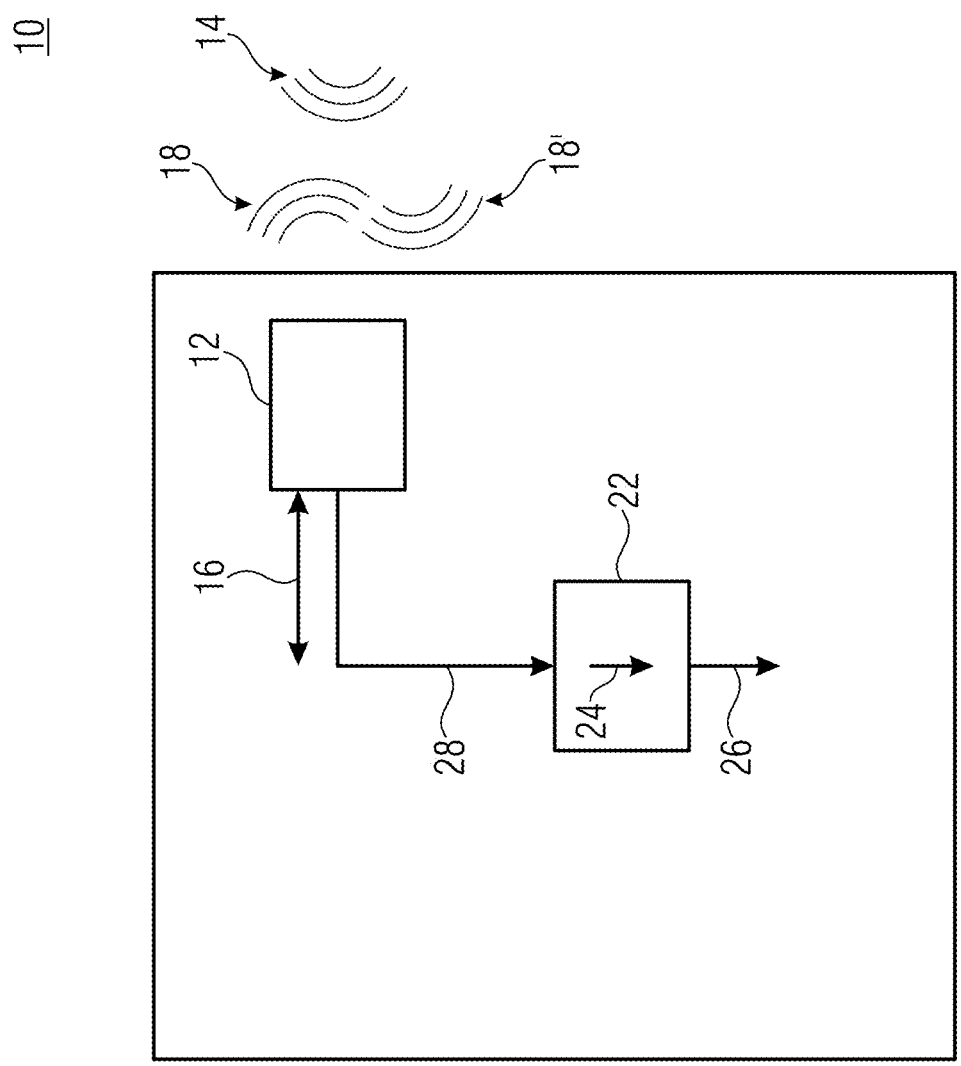
FIG. 1a shows a schematic block diagram of a portable device according to an embodiment.

Equal or equivalent elements or elements with equal or equivalent functionality are denoted in the following description by equal or equivalent reference numerals even if occurring in different figures.

DETAILED DESCRIPTION OF ILLUSTRATIVE EMBODIMENTS

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein relate to portable devices. A portable device may relate to devices or structures that are intended, configured or made for being carried or worn by a user during its operation. Example portable devices are a mobile phone, a laptop computer, a headphone, music players or the like.

Such portable devices may be switched on and off by a user or may interact with the user in a different way. For example, a mobile phone, in particular a smartphone may be viewed by a user whilst typing a text message and may be held near an ear whilst using the device as a telephone. During the latter, the screen may be switched off so as to save energy of the battery and/or to avoid erroneous inputs to the device by attaching the touch screen.

As a further example, a headphone may be switched on when wearing the headphone and may be switched off when removing the headphone from the head. Same is true for headphones including an active noise cancellation (ANC) that are adapted to generate noise that cancels external noise at the ear of the user. Such a functionality may be switched on when wearing the ANC-headphone and may be switched off when removing the headphone from the head of the user. Thereby, unnecessary noise emissions and/or power consumption may be avoided.

FIG. 1a shows a schematic block diagram of a portable device 10 according to an embodiment. The portable device 10 may comprise a microphone structure 12 configured for converting a received audio signal 14 into an electronic signal 16. The electronic signal 16 may represent the received audio signal 14 i.e., it may be an electronic version or representation thereof. The audio signal 14 may be an external audio signal to be captured but also be a remaining signal to be detected, for example, from an ANC headphone. That is, the microphone structure 12 may be an error microphone.

The microphone structure 12 may, in addition to converting the audio signal 14 into the electronic signal 16, be configured for transceiving an ultrasonic wave 18. As a processing of the audio signal 14 may be restricted to an audio frequency range, e.g., between 20 Hz and 20 kHz or the like, conversion of the audio signal 14 and transceiving the ultrasonic wave 18 may be performed simultaneously but also sequentially.

Transceiving the ultrasonic wave 18 may include to transmit the ultrasonic wave 18 and to receive a reflection 18' of the ultrasonic wave 18. The reflection 18' may be received with a certain time delay with respect to the time of transmission of the ultrasonic wave 18, wherein the time delay may be based on a distance between the microphone structure 12 and an object providing for a reflecting surface or body for reflecting the ultrasonic wave 18, thereby generating the reflection 18'. Thus, reception of the reflection 18' may be optional as it may be based on the presence of the object. In case of an absence of the object, reflection may remain absent. An absence of the object may be equal or equivalent with a distance to the object exceeding a threshold value. Such an exceedance may lead to amplitudes and/or time delays that may be considered as being too low or too long to be processed or measured.

The portable device 10 may comprise a control unit 22 configured for evaluating the reflection 18' so as to obtain an evaluation result 24. The control unit 22 may be configured for controlling an operation of the portable device 10 based on the evaluation result 24. For example, the control unit 22 may output or provide for a control signal that adapts or activates or deactivates a functionality of the portable device 10, for example, a component of the portable device 10 may be switched on or off or the functionality may be switched or altered elsewise. The control unit 22 may comprise a processor, a microcontroller, an application specific integrated circuit (ASIC), a field programmable gate array (FPGA) or the like. Although being described as a separate component, the control unit 22 may also be integrated into the microphone structure 12.

The control unit 22 may receive a signal 28 from the microphone structure 12 that contains information about the received reflection 18'. The signal 28 may additionally comprise information about the ultrasonic wave 18 emitted by the microphone structure 12, for example, to allow a determination of a time of flight by the control unit 22. Alternatively, the control unit 22 may already have access to such information, for example, when controlling the microphone structure 12.

According to an embodiment, signals 16 and 28 may be a same signal and the control unit 22 may separate both signals or may distinguish between both signals, for example, in response to a frequency range of the signal 14 being different from a frequency range of the ultrasonic wave 18. Alternatively, the information relating to the reflection 18' may be directed to the control unit 22 as a separate signal.

The control unit 22 may be configured to control the microphone structure 12 so as to transmit the ultrasonic wave 18. For example, the control unit 22 may provide a control signal 22a to the microphone structure 12 containing such information. The microphone structure 12 may be configured to be operable in at least two different frequency ranges. For example, a first frequency range is an audio range, for example, a frequency range that may be perceived by humans, for example, between 20 Hz and 20 kHz or the like. Separate here from a second frequency range, the ultrasonic frequency range of the ultrasonic wave 18 may be arranged. For example, the ultrasonic frequency range may be in a frequency range of at least 40 kHz and at most 120 kHz, of at least 60 kHz and at least 100 kHz or of at least 70 kHz and at most 90 kHz, for example, 80 kHz.

A frequency gap may be arranged between the audio range and the ultrasonic range. Although the audio signal 14 may also comprise portions being outside the audio range, for example, the microphone structure 12 may be configured for generating the electronic signal 16 so as to have portions in the audio range only. The microphone structure 12 may comprise an evaluation circuit, for example, an application specific integrated circuit (ASIC), a microcontroller or a field programmable gate array (FPGA) for converting the audio signal 14 into the electronic signal 16. For example, the evaluation circuit may be part of the control unit 22 or may form a common component with the control unit 22.

The microphone structure 12 may comprise a microelectromechanical system (MEMS). For example, a membrane structure and/or one or more back plate structures of the microphone structure 12 may comprise a semiconductor material, for example, a gallium arsenide material or a silicon material. Such a MEMS microphone structure may be operable at a large frequency range including the audio frequency range and the ultrasonic frequency range.

By use of the control signal 26, the operation of the portable device 10 may at least in parts be controlled based on the reflection 18'. This allows to distinguish between a scenario in which the ultrasonic wave 18 remains unreflected, e.g., when no reflection 18' is received or when an amplitude thereof is below a predetermined threshold, and a scenario in which the reflection 18' is received or is at least the predetermined threshold. This allows for an automated control of the portable device 10.

Figure 1B:
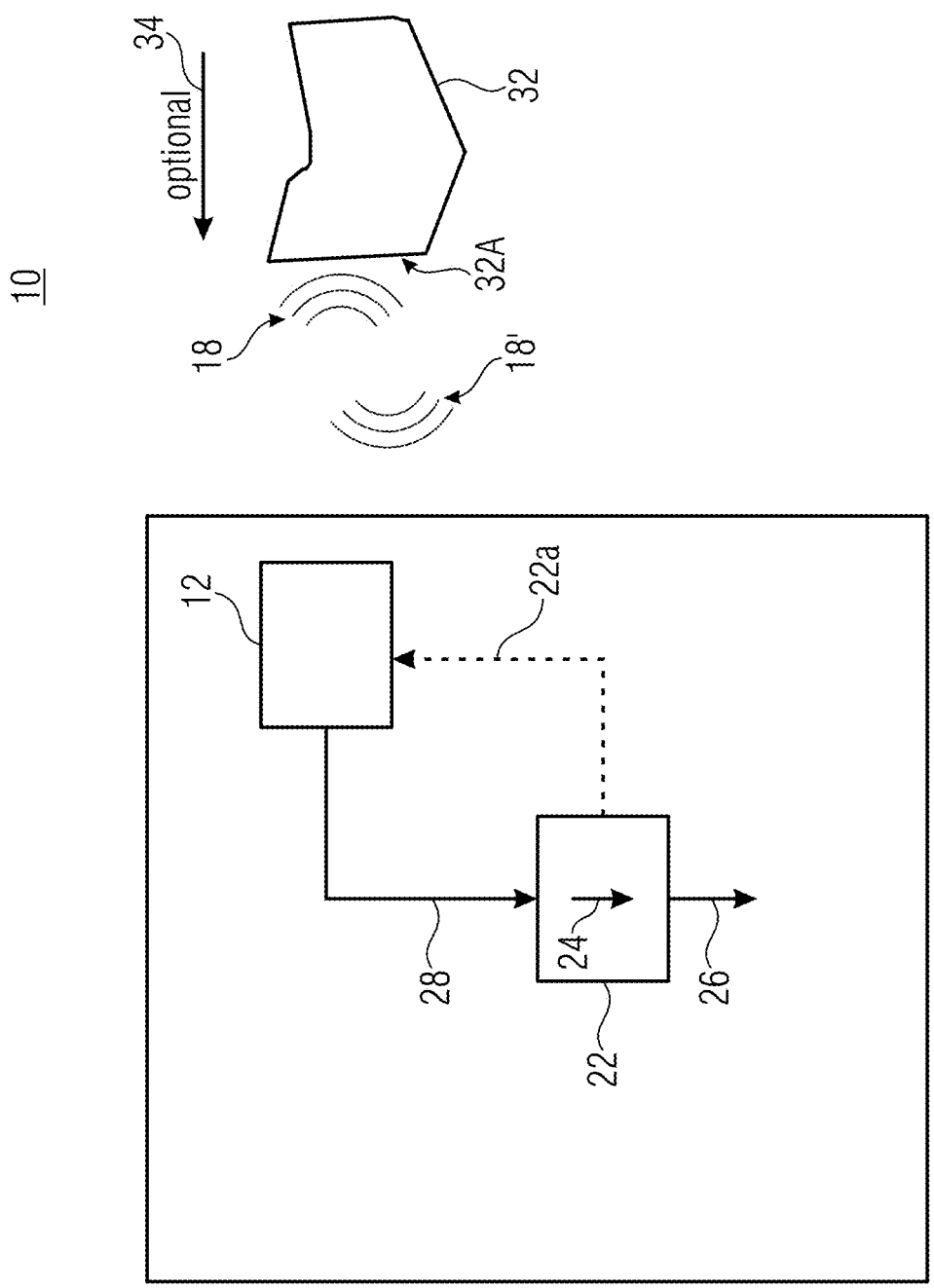
FIG. 1b shows a schematic block diagram of the portable device, wherein a reflection of an ultrasonic wave is obtained at an object.

FIG. 1b shows a schematic block diagram of the portable device 10, wherein the reflection 18' is obtained responsive to a reflection of the ultrasonic wave 18 at an object 32. The object 32 may be, for example, related to a user. For example, the object 32 may be a head of a user or a part thereof, for example, an ear or the like. Although some embodiments described herein relate to an identification or categorization of the object 32, embodiments may simply detect the reflection 18' which implicitly requires the object 32 reflecting the ultrasonic wave 18.

The object 32 may perform a movement 34 along any direction in space. By continuous evaluation of the reflection 18', the control unit 22 may also determine or detect a speed and/or position and/or a direction of the movement 34 of the object 32. The control unit 22 may be configured for determining an approach of the object 32 towards the microphone structure 12. The control unit 22 may be configured for controlling the portable device 10 based thereon. For example, the portable device 10 is a headphone. The control unit may be configured for preparing for an acoustic shock when the headphone is put on a head of a user. This may mean, for example, a deactivation, to control for a lower sound pressure of a loudspeaker or for ignoring an update of an adaptive controller of an active noise cancellation system or the like. In other words, also self-transitions are possible, since the distance information can be more than just a simple on/off indication. E.g., this can be used in a so-called put-on situation where the proximity information can have the system to prepare for a pressure shock. This microphone with ultrasonic transceiver functionality can either output dedicated proximity data or the proximity data can be calculated from the audio signal in a standard audio processing path.

According to an embodiment, the portable device 10 may be a wearable device. The control unit 22 may be configured for providing a wear detection so as to control the operation of the portable device 10. When referring again to the example of a headphone, the wear detection may be performed so as to detect if a user puts on the headphone or takes off the headphone. Next on the evaluation of the reflection 18' a presence of the object 32 adjacent to the portable device 10 may be detected. Alternatively or in addition, an absence of the object 32 may be detected. In case of detecting the presence, a function of the portable device may be switched or controlled into a first mode. Based on detecting an absence of the object, the function may be controlled into a different second mode. When referring to a headphone, the first mode may be, for example, active or on, i.e., the function may be activated. The second mode may be a deactivation of the function. That is, the controller may switch on the headphone when detecting that the headphone was put on and/or may deactivate the headphone when detecting that the headphone was taken off.

When referring to the example of the portable device 10 being a mobile phone, the first mode may be an inactive or deactivated screen, at least in view of a touch sensitivity and/or a displaying function. The second mode may be an active mode of the display.

Ultrasonic waves allow not only to detect a presence or absence of the object 32 but also for detecting a structure of the object 32. For example, the control unit 22 may be configured for determining a topography or surface profile at least of a surface 32A of the object 32, facing the microphone structure 12. For example, the object 32 may be an ear of a user. The control unit 22 may be configured for determining a topography of the ear that reflects the ultrasonic wave 18. The control unit 22 may determine based on the topography a position of the headphone with respect to a left and/or right ear on a head of a user. For example, the microphone structure 12 to emit the ultrasonic wave 18 may be located in one or both ear pieces of the headphone such that the control unit 22 may derive in which of both orientations the headphone was placed on a head. This may be used to adapt, e.g., left/right channels of an audio signal to be generated.

According to an embodiment, the control unit 22 may be configured for classifying or identifying the object, e.g., by determining the topography and to discriminate the determined topography from other topographies and/or by correlating the determined topography to be a known topography. For example, the topography of the ear may be associated with a user and/or with settings of the user, e.g., a preferred sound pressure level, loudness or other settings of the portable device 10 which may also include settings of other subsystems, e.g., a radio station, playlist or the like to be played.

For example, the control unit 22 may analyze the echo, i.e., the reflection 18' by use of machine learning so as to determine one of a plurality of waring scenarios, e.g., left/right detection, or to extract an acoustic fingerprint of the object 12, e.g., the ear. The acoustic fingerprint may be learned to the device 10, the control unit 22 respectively, for example, by calibrating the device for one or more parameters of the reflection 18' caused by the object 12, e.g., variations in the frequency or the like.

Alternatively or in addition to machine learning, for example, a directional characteristic may be implemented into the device 10 by arranging the transceiver or microphone structure 12 so as to be inclined with respect to the awaited or predetermined position of the object 12. Therefore, different waring scenarios may lead to different reflections 18'. For example, in a first scenario, the acoustic signal 18 may travel into the ear which may act as a kind of acoustic parabolic mirror and causing a reflection 18' with a high magnitude, i.e., a loud signal, whilst, when having a different scenario (different ear), the inclined direction may point towards a different part of the object 12, e.g., the head, thereby causing a different, e.g., lower, magnitude. Thereby a differentiation may be performed by control unit 22 based on the magnitude.

Alternatively or in addition, the control unit 22 may determine, if the object 32 being detected is an ear or is a different object. For example, the control unit 22 may control the headphone so as to be active when the presence of an ear is detected but may keep the headphone off if the object 32 is not an ear, allowing to keep the headphone deactivated when placing it on a holder. Ear detection and/or user determination may be performed, for example, at ANC headphones and/or at other headphones e.g., such for playing music or speech.

For example, when detecting a position of a headphone with respect to a left and/or right ear, the control unit 22 may control the operation of the headphone so as to switch between a left channel and a right channel to be reproduced or output with the headphone.

The control unit 22 may alternatively or in addition be configured for deriving, from the reflected ultrasonic wave 18' a pattern of the object, e.g., an ear cup to which the headphone is applied. The control unit 22 may determine at least one operation parameter of the headphone associated with the pattern and for controlling the headphone according to the operation parameter. For example, the headphone may determine if the ear is small or large and may determine whether to provide for a signal with high or low (loud or silent) amplitude and/or may adapt a model of an ANC channel responsive to the varying shape or volume of the ear.

The control unit 22 may alternatively or in addition be configured for deriving, from the reflected ultrasonic wave 18' a pattern or topology of the object, e.g., of an ear cup to which the headphone is applied. The control unit 22 may determine at least one operation parameter of the headphone associated with the pattern and for controlling the headphone according to the operation parameter. For example, the headphone may determine if the ear is small or large and may determine whether to provide for a signal with high or low (loud or silent) amplitude and/or may adapt a model of an ANC channel responsive to the varying shape or volume of the ear. According to an embodiment, the shape of an ear may be related to a specific profile, possibly related to an individual user. The profile may contain user-specific settings as, for example, a minimum or maximum amplitude or level of sound pressure to be emitted, a frequency response, a loudness or the like.

FIG. 2a shows a schematic diagram of a portable device 20 according to an embodiment interacting with a user 36. The portable device 20 is implemented, for example, as an ANC headphone having a microphone 38 configured for detecting or capturing external noise 42, i.e., respective audio signals. The portable device 20 comprises a loudspeaker 44 which is controlled so as to output a so-called anti-noise with respect to the external noise 42 so as to at least partially cancel the external noise 42. The portable device 20 comprises the microphone structure 12 being configured to emit the ultrasonic wave 18 and to receive the reflection 18'. The microphone structure 12 may be utilized, synergistically, as an error microphone of the ANC headphone. Detection of the object 32, i.e., the user 36 may be performed at a same time, i.e., simultaneously, or sequentially. That is, the control unit 22 may be configured for operating the microphone structure 12 for converting the received audio signal and for transceiving the ultrasonic wave 18 simultaneously or sequentially.

The control unit 22 may be configured for evaluating the reflection 18' so as to detect a presence of the user 36 adjacent to the portable device 20. Based on the presence, the control unit 22 may activate the active noise cancelling function. Based on a detected absence, the control unit may alternatively or in addition deactivate the active noise cancelling function.

An ultrasonic transceiver mode, the microphone's audio performance might be interrupted for a short moment of time. Embodiments are related to prevent negative effects on proper processing operations or to cause audible effects. From a system's architectural point of view, the error microphone may be a preferred structure element to be used, since it is used, e.g., in feed forward topologies to update the adaptive algorithm where short signal discontinuities do not harm or can easily be considered. In hybrid ANC topologies, smart switching or transition methods can be applied to mask the audio downtime during the transceiver operation.

Figure 2B:
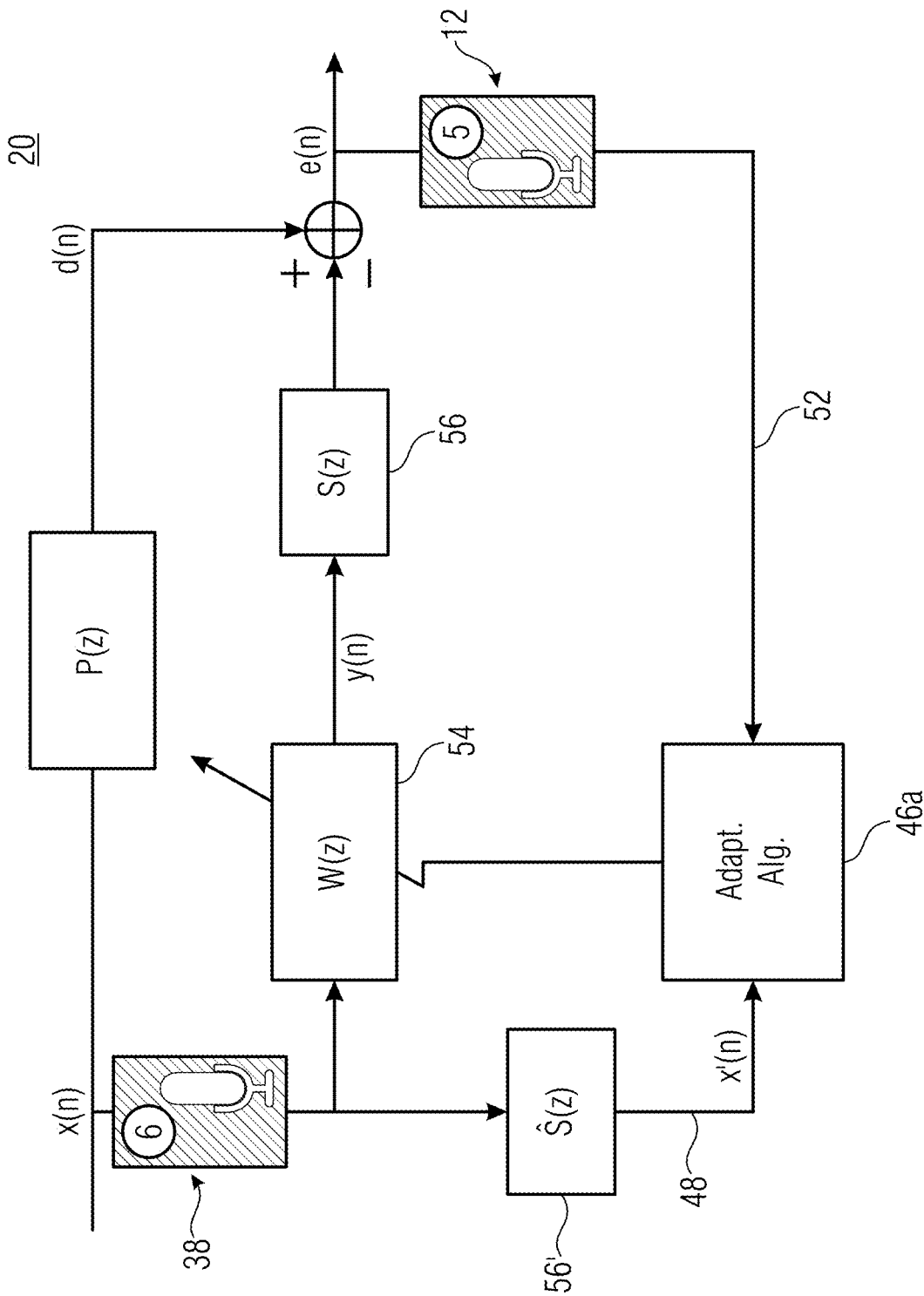
FIG. 2b shows a schematic block diagram of a portable device according to an embodiment being implemented with a feed forward control.

FIG. 2b shows a schematic block diagram of the portable device 20 being implemented with a feed forward control. The forward control of the ANC headphone may include an error determiner 46a, for example, a Least Mean Square (LMS) block for determining an error between a predicted signal 48 and error signal 52 obtained from the microphone structure 12 to implement an adaptive algorithm using an adaptive filter 54 denoted with W(z). Thereby, a path 56 through the ANC headphone may be modified, corrected or reduced with regard to the noise based on an estimation 56' of the path 56 denoted by S(z).

Figure 2C:
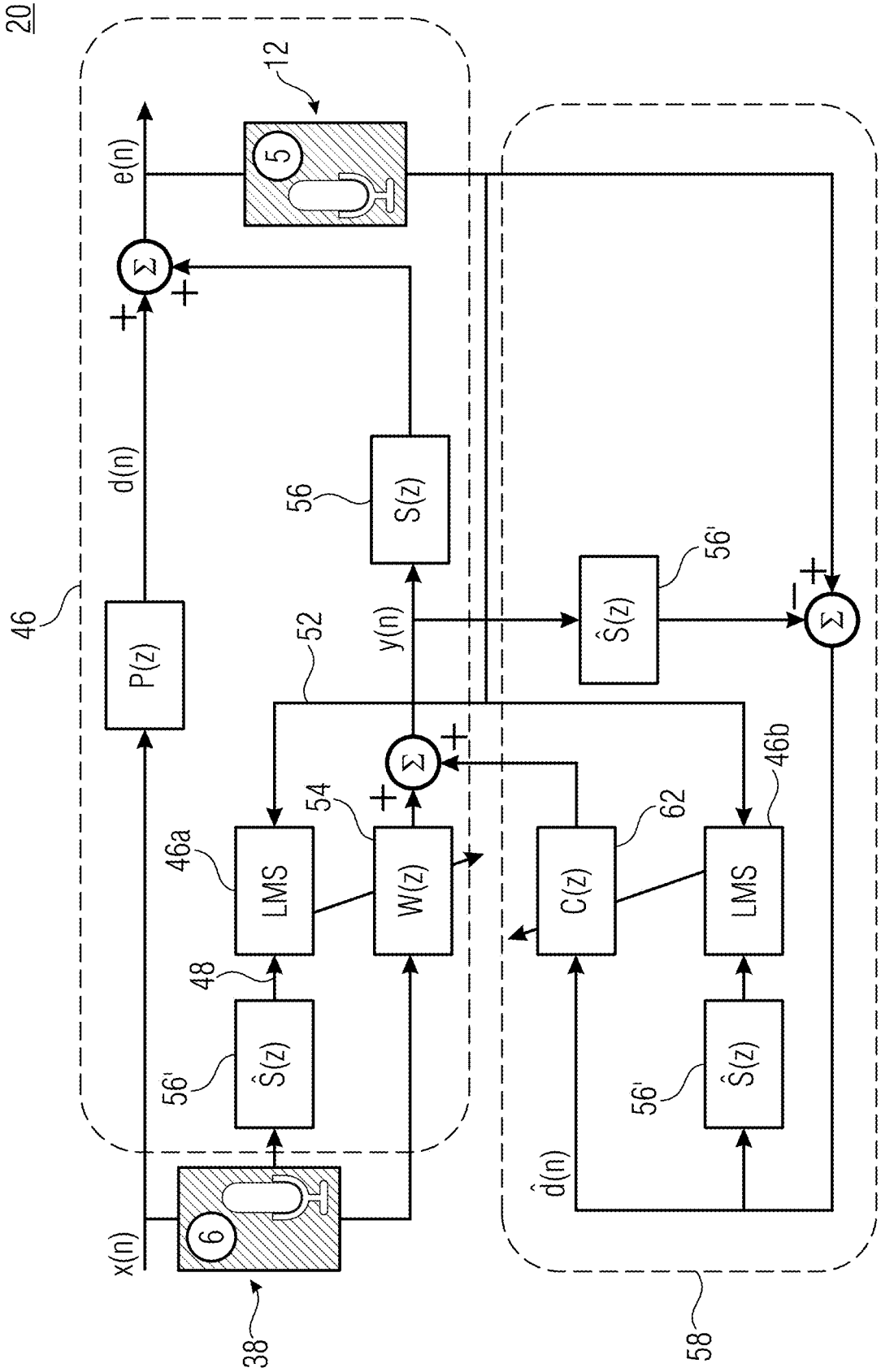
FIG. 2c shows a schematic block diagram of parts of a portable device according to an embodiment, wherein the adaptive control is based on a feedback control.

FIG. 2c shows a schematic block diagram of parts of the portable device 20, wherein the adaptive control is based on a feedback control. A first section 46 may implement a structure that is based on the feedforward control of FIG. 2a which is combined with a second section 58 to implement the feedback such that the structure may also be referred to as a hybrid ANC topology. The output of the microphone structure 12, i.e., the error signal detected may be used to feed another error determiner 46b so as to adjust an adaptive filter 62.

A hybrid ANC system as shown in FIG. 2c may be understood as a combination of feedforward and feedback topologies. For example, feedforward topologies may provide for benefits for a broadband noise for a higher degree when compared to narrow band noise. For example, a signal loss and phase shift due to the low frequency roll off of the reference microphone may limit the attenuation performance at low frequencies in feedforward topologies. Under such circumstances, feedback topology may be used. For example, in feedback topologies the measured residual error signal may be used to estimate the reference signal d(n). So, the feedforward may attenuate the primary noise that is correlated with the reference signal, whereas the feedback may cancel the components of noise that are reconstructed out of the residual error e(n) and the filter output y(n) multiplied with the secondary path estimation 56' shown as S(z). The output of the microphone structure 12 and thus the error signal e(n) detected may be used to feed the error determiner 46b so as to adjust the adaptive filter 62 and it may be used to generate an estimate of the reference signal d(n) as input for the adaptive filter 62.

In other words, ANC headphones may use dual microphone setups as shown in FIG. 2c. One microphone 38 may capture environmental noise on the outside of the ear cup and a second microphone 12 is used to tune the algorithms with an error signal from the inside of the ear cup.

By using the microphone structure 12 for both, as an error microphone and as a structure to evaluate the reflection 18' shown in FIG. 2a, the control 22 may skip updates of the adaptive filters 54 and/or 62 based on the reflection 18' shown in FIG. 2b. That is, the reflection 18' is an artificially generated error which may cause errors in the adaptive filters 54 and/or 62 when being considered during the updates. For example, the control unit may pause or cancel an update during time intervals during which the reflection 18' is received and/or a time during which and shortly after the ultrasonic wave 18 is transmitted. Alternatively or in addition, a separation may be performed in the frequency range so as to only consider a frequency range of the audio signal.

That is, the portable device being a headphone may comprise an active noise canceller configured for active noise cancelling based on an adaptive controller configured for continuously executing an adaption of a control of the active noise canceller based on the received audio signal. The adaptive controller is configured for pausing the adaptation during a time interval during which the ultrasonic wave is transceived. Alternatively the adaptive controller may be configured for performing the adaptation unaffected by the ultrasonic wave 18.

In other words, FIG. 2c shows a schematic block diagram of an implementation of the portable device 20 having a hybrid ANC topology.

Figure 3A:
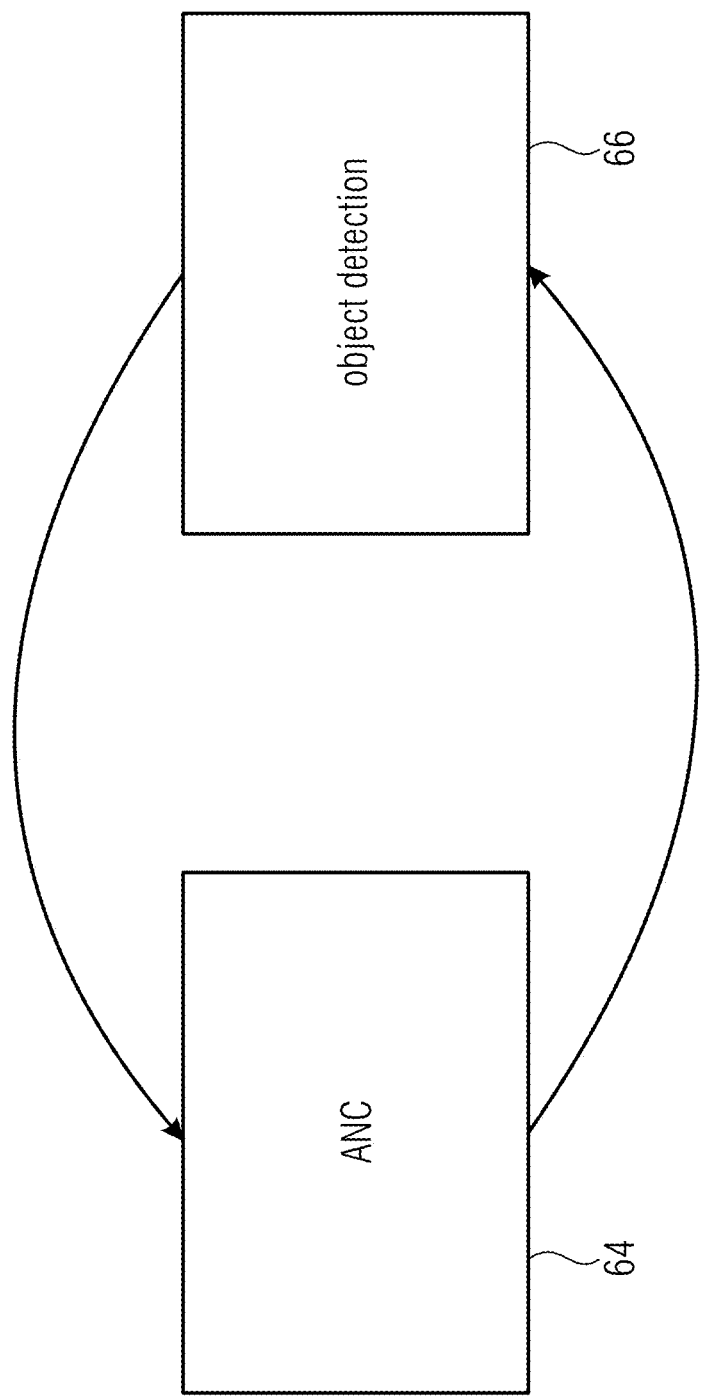
FIG. 3a shows a schematic block diagram of an operation of an ANC headphone according to an embodiment.

FIG. 3a shows a schematic block diagram of an operation of an ANC headphone according to an embodiment. During a first operation mode 64 ANC may be performed. During a second operation mode 66 object detection may be performed, i.e., it may be determined if an object, e.g., a head is near the headphone. During the object detection 66 ANC 64 may be paused or, alternatively, be continued, for example, whilst leaving the ANC parameters unadapted.

Figure 3B:
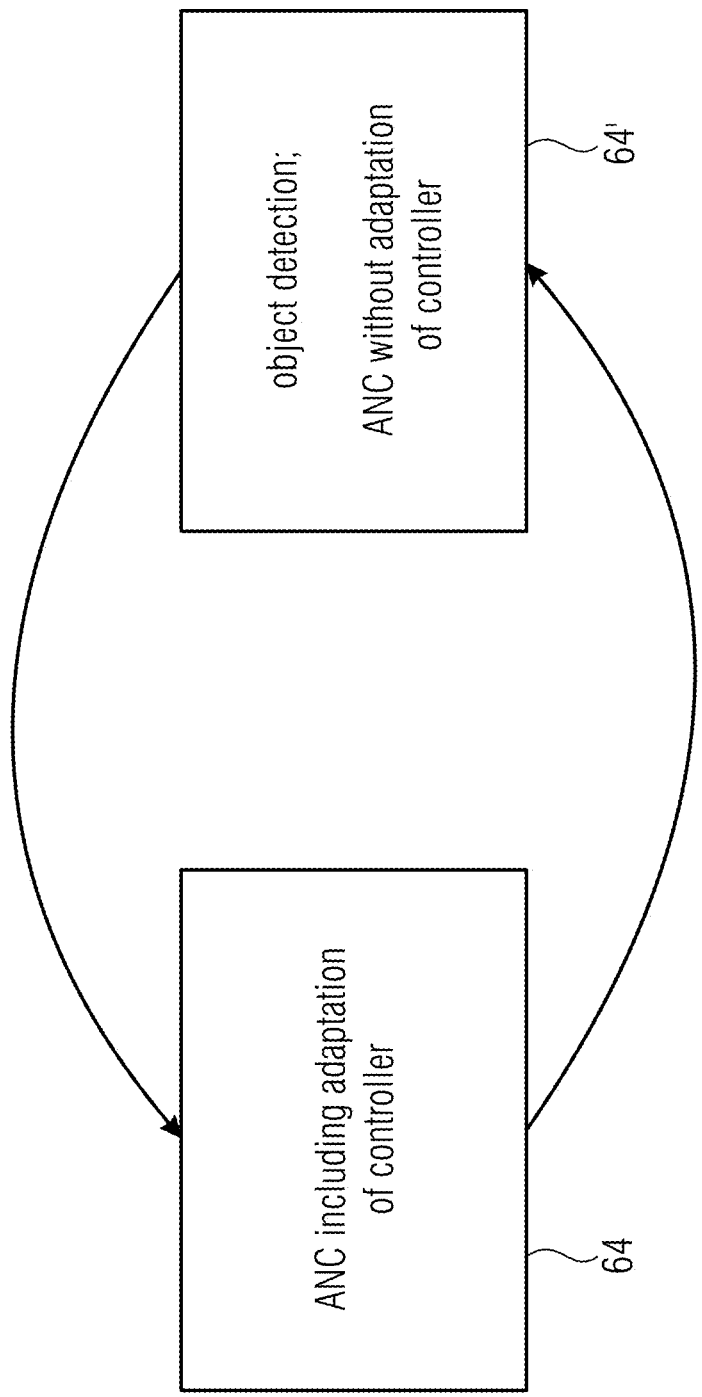
FIG. 3b shows a schematic diagram of a further way for controlling or operating the ANC headphone according to an embodiment.

FIG. 3b shows a schematic diagram of a further way for controlling or operating the ANC headphone. In the first operating mode 64, the controller is adapted whilst, at a different operating mode 64' the object detection is performed as described in connection with the operating mode 66. In the operating 64', ANC is performed or continued but without an adaptation of the controller or the adaptive filters.

In other words, a wear-detection can be a feature in active noise cancelling (ANC) headphones. In order to not disturb the environment and especially in the case of wireless applications, do not unnecessarily consume power, it may be valuable to mute audio and to switch off power intensive processing in ANC headphones when they are taken off by the user. A common use case is that the user takes off the headphones and forgets to manually stop audio and/or switching off. The headphone will continue to run, spreading sound in the environment until the battery is empty. By automatically switching off the headphone, this may be prevented. When compared to symbol error-prone electromechanical on/off switches, embodiments provide for a reliable detection.

Figure 4:
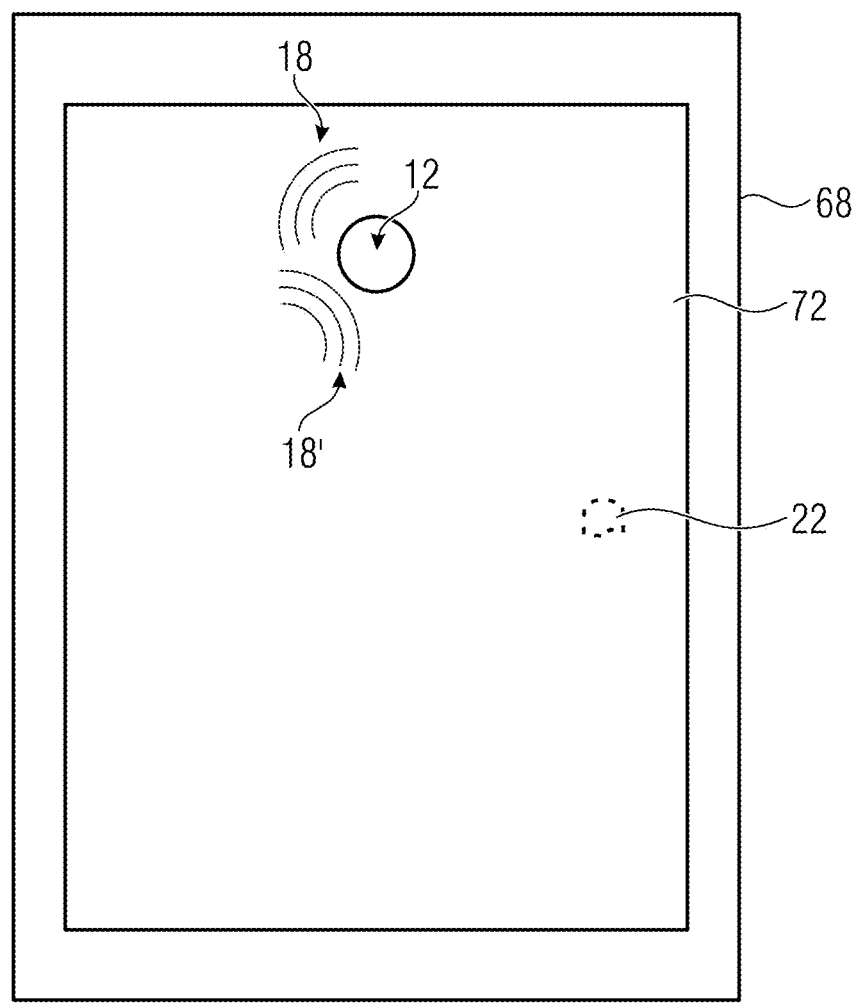
FIG. 4 shows a schematic block diagram of a portable device being a mobile phone according to an embodiment.

FIG. 4 shows a schematic block diagram of a portable device 40 according to an embodiment. The portable device

40 is, for example, a mobile phone. Although the explanation given herein is related to a smartphone in which antennas and the like may be arranged internally of a case 68 and which may have a comparatively large display 72, the embodiments also relate to other kinds of mobile phones including personal digital assistants (PDA) or table computers having a telephone functionality or the like. The portable device 40 comprises the microphone structure 12 which may be arranged, for example, near a loudspeaker used for the telephone or behind the display 72 or any other location. For example, the microphone structure 12 is arranged so as to transceive the ultrasonic wave into a direction along which the object 32 is expected to be, for example, the head of the user.

The reflection 18' of the ultrasonic wave 18 may be used to detect a presence of a respective object adjacent to the portable device 40. Based thereon, a functionality of the portable device 40 may be adapted. For example, the display 72 may be deactivated based on the determined presence. Alternatively or in addition, based on a determined absence, the display 72 may be activated.

Figure 5:
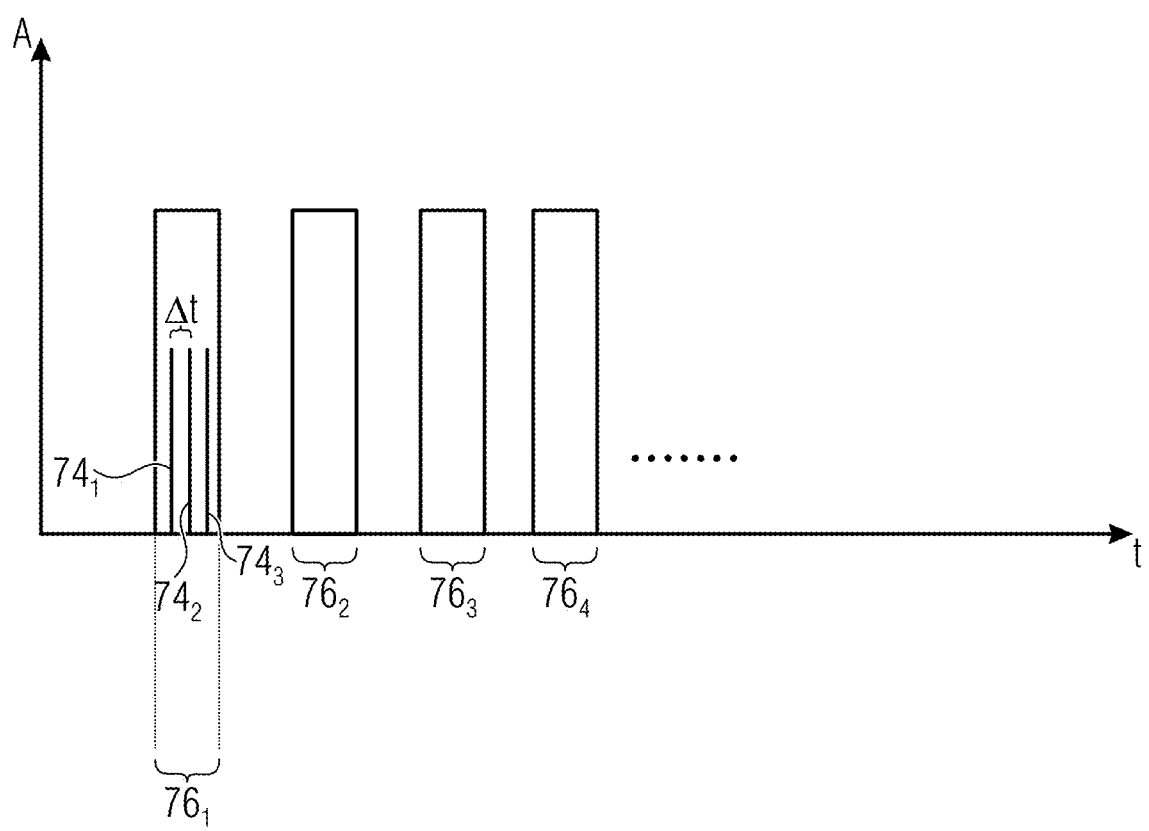
FIG. 5 shows a schematic diagram for providing further details in connection with the ultrasonic wave according to an embodiment.

FIG. 5 shows a schematic diagram for providing further details in connection with the ultrasonic wave 18 being transceived with the microphone structure 12, for example, as part of the portable device 10.

An abscissa shows a time axis t whilst an ordinate shows, simplified, an amplitude A of a control of the microphone structure for transceiving the ultrasonic wave, in particular for transmitting it. Time t and amplitude A are of qualitative nature only. Unless explicitly stated otherwise, illustrated same amplitudes and/or time may also refer to amplitudes and/or times different from each other or vice versa.

For transceiving the ultrasonic wave 18, the microphone structure 12 may be controlled so as to emit a number of pulses $74_1$ to $74_3$. Although three pulses $74_1$ to $74_3$ are displayed, any other suitable number may be transmitted, for example, at least one pulse, at least two pulses, at least three pulses, at least five pulses or at least ten pulses or even more or alternatively less. By way of example, the microphone structure 12 is controlled so as to output five pulses during an evaluation interval $76_1$, $76_2$, $76_3$ and/or $76_4$. A time difference Δt between single pulses $74_1$ and $74_2$ may be related to a frequency of the obtained ultrasonic wave of, e.g., at least 40 kHz and at most 120 kHz such as 80 kHz.

A repetition rate (1/Δt) of the pulses $74_i$ with i, 1, . . . , and a number of pulses to be transmitted may relate to a duration of the measurement intervals $76_1$, $76_2$, $76_3$ and/or $76_4$ or further measurement intervals. Embodiments provide for measurement intervals 76 that have a duration in time or at most 1 ms, of at most 0.2 ms or of at least 0.07 ms. For example, a number of five pulses being transmitted at a frequency of 80 kHz may lead to a time duration of approximately 0.0625 ms. A further time of the measurement interval $76_1$ may be used to evaluate for the reflection 18'. Therefore, a time duration of the measurement interval $76_1$ to $76_4$ may be an expected maximum range of the object to which and from which the ultrasonic wave has to travel. In case, for example, the reflection 18' arrives after the measurement interval $76_1$, the signal may be ignored.

The control unit may be configured for controlling the microphone structure so as to transceive the ultrasonic wave and for evaluating the reflection of the ultrasonic wave during a plurality of measurement intervals $76_1$ to $76_4$ having a repetition rate of at least 10/s, of at least 15/s and at least 20/s.

Figure 6:
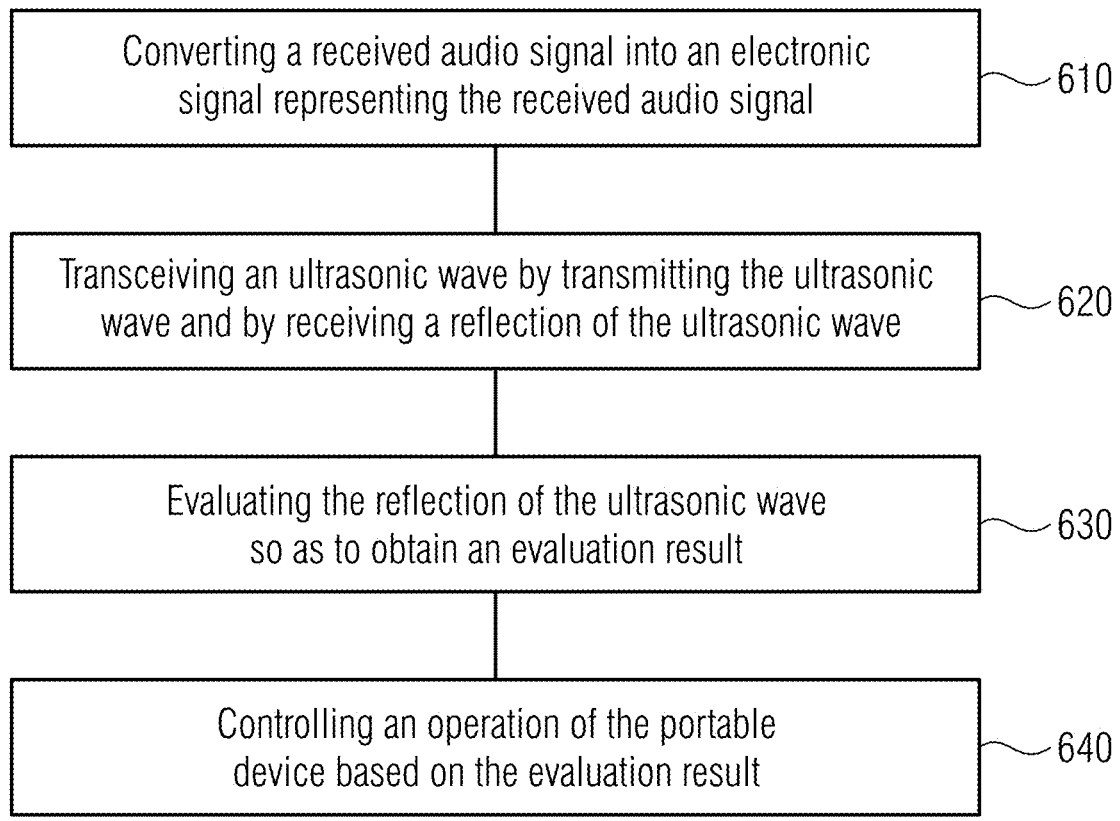
FIG. 6 shows a schematic flowchart of a method for operating a portable device according to an embodiment.

FIG. 6 shows a schematic flowchart of a method for operating a portable device according to an embodiment.

The method 600 comprises a step 610 in which a received audio signal is converted into an electronic signal representing the received audio signal. A step 620 comprises transceiving an ultrasonic wave by transmitting the ultrasonic wave and by receiving a reflection of the ultrasonic wave. A step 630 comprises evaluating the reflection of the ultrasonic wave so as to obtain an evaluation result. A step 640 comprises controlling an operation of the portable device based on the evaluation result.

The step 610 may be performed, optionally, after the step 640, for example, responsive to the controlled operation.

That is, the evaluation result may be used to switch on and/or to switch off the portable device and/or for adapting other parameters.

The method may optionally comprise steps related to determining a topography of an object, e.g., an ear cup. The method may comprise determining at least one operation parameter related to a previously stored user profile (user identification, i.e., ear cup profile may be associated with a specific user) and/or to a determined profile (user categorization, e.g., small/large ear cup; left/right ear cup); and for controlling the portable device based on the operation parameter. Such steps may be performed, for example, using the portable devices described herein.

To portable structures, a wear-detection functionality can be added without changing the hardware arrangement, i.e., to synergistically use structures. Further, the ANC topology, etc. may also be used by using an audio microphone with ultrasonic transceiver functionality. This microphone with ultrasonic transceiver functionality can, in addition to its standard microphone operation mode, be used as proximity sensor. My measuring the time between transmitted and reflected received ultrasonic signal, it is possible to calculate the distance from an object as indicated, for example in FIG. 2a. By making use of the proximity information, it is possible to properly enable/disable the audio signal as well as to better control advance processing when the user takes on/off the headphones. Just keeping the microphone with ultrasonic transceiver functionality in an always on state, all other strongly power-hungry operations can be turned off to significantly reduce overall power consumption when compared to a standard on operation.

Further, the ultrasonic reflection from the ear may be used to identify the ear of a specific user. With this identification, the headphone may be enabled just for a specific user and/or specific user profiles including acoustic properties like maximum level, frequency response, loudness, etc. can be activated. In addition, it may be used to identify the left and right ear for automatic left/right audio channel switching. Directional wearing awareness is therefore possibly superfluous. This functionality may be enabled with the help of machine learning techniques.

Embodiments are thus related to a proximity-based wear-detection for ANC headphones by using an audio microphone with ultrasonic receiver functionality.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A portable device comprising:
   a microphone structure configured for converting a received audio signal into an electronic signal representing the received audio signal and for transceiving an ultrasonic wave by transmitting the ultrasonic wave and by receiving a reflection of the ultrasonic wave;
   a control unit configured for evaluating the reflection of the ultrasonic wave so as to obtain an evaluation result and for controlling an operation of the portable device based on the evaluation result, wherein the portable device comprises a headphone, wherein the control unit is configured for deriving, from the reflected ultrasonic wave a pattern of an ear cup to which the headphone is applied and for determining at least one operation parameter of the headphone associated with the pattern and for controlling the headphone according to the operation parameter.

2. The portable device according to claim 1, wherein the control unit is configured for providing a wear detection so as to control the operation of the portable device.

3. The portable device according to claim 1, wherein the control unit is configured for evaluating the reflection of the ultrasonic wave so as to detect a presence of an object adjacent to the portable device and for controlling a function of the portable device into a first mode so as to control the operation of the portable device; and/or
   for evaluating the reflection of the ultrasonic wave so as to detect an absence of an object adjacent to the portable device and for controlling the function of the portable device into a second mode so as to control the operation of the portable device.

4. The portable device according to claim 1, wherein the control unit is configured for:
   determining a topography of an ear reflecting the ultrasonic wave and to determine at least one of a position of the headphone with respect to a left and/or right ear on a head and for adapting an operation of the headphone based on the position; and/or
   determining an approach of an object towards the microphone structure and for controlling the headphone so as to prepare for an acoustic shock when the headphone is put on a head.

5. The portable device according to claim 1, comprising an active noise cancelling function; wherein the microphone structure is an error microphone; wherein the control unit is configured for evaluating the reflection of the ultrasonic wave so as to detect a presence of an object adjacent to the portable device and for activating the active noise cancelling function based on the presence; and/or
   for evaluating the reflection of the ultrasonic wave so as to detect an absence of an object adjacent to the portable device and for deactivating the active noise cancelling function based on the absence.

6. The portable device according to claim 5, comprising an active noise canceller configured for active noise cancelling based on an adaptive controller configured for continuously executing an adaptation of a control of the active noise canceller based on the received audio signal;
   wherein the adaptive controller is configured for pausing the adaptation during a time interval during which the ultrasonic wave is transceived; or
   wherein the adaptive controller is configured for performing the adaptation unaffected by the ultrasonic wave.

7. The portable device according to claim 1, wherein the control unit is configured for controlling the microphone structure so as to transmit the ultrasonic wave at a frequency of at least 40 kHz and at most 120 kHz.

8. The portable device according to claim 1, wherein the control unit is configured for controlling the microphone structure so as to transceive the ultrasonic wave and for evaluating the reflection of the ultrasonic wave during a measurement intervals having a duration of at most 1 ms.

9. The portable device according to claim 1, wherein the control unit is configured for controlling the microphone structure so as to transceive the ultrasonic wave and for evaluating the reflection of the ultrasonic wave during a plurality of measurement intervals having a repetition rate of at least 10/s.

10. The portable device according to claim 1, wherein the control unit is configured for operating the microphone structure for converting the received audio signal and for transceiving the ultrasonic wave simultaneously or sequentially.

11. The portable device according to claim 1, wherein the microphone structure comprises a MEMS microphone structure.

12. A method for operating a headphone, the method comprising:
   converting a received audio signal into an electronic signal representing the received audio signal;
   transceiving an ultrasonic wave by transmitting the ultrasonic wave and by receiving a reflection of the ultrasonic wave;
   evaluating the reflection of the ultrasonic wave so as to obtain an evaluation result; and
   controlling an operation of the headphone based on the evaluation result by deriving, from the reflected ultrasonic wave a pattern of an ear cup to which the headphone is applied and for determining at least one operation parameter of the headphone associated with the pattern and for controlling the headphone according to the operation parameter.

13. A portable device comprising:
   a microphone structure configured for converting a received audio signal into an electronic signal representing the received audio signal and for transceiving an ultrasonic wave by transmitting the ultrasonic wave and by receiving a reflection of the ultrasonic wave;
   a control unit configured for evaluating the reflection of the ultrasonic wave so as to obtain an evaluation result and for controlling an operation of the portable device based on the evaluation result,
   wherein the portable comprises a mobile phone having a display, and
   wherein the control unit is configured for evaluating the reflection of the ultrasonic wave so as to detect a presence of an object adjacent to the mobile phone and for deactivating the display based on the presence; and/or for evaluating the reflection of the ultrasonic wave so as to detect an absence of an object adjacent to the mobile phone and for activating the display based on the absence.

* * * * *